(12) United States Patent
Kumar et al.

(10) Patent No.: US 9,156,395 B2
(45) Date of Patent: Oct. 13, 2015

(54) LOW PROFILE HIGHLY EFFICIENT VEHICULAR LED MODULES AND HEADLAMPS

(71) Applicant: Ford Global Technologies, LLC, Dearborn, MI (US)

(72) Inventors: Arun Kumar, Farmington Hills, MI (US); Mahendra Somasara Dassanayake, Bloomfield Hills, MI (US); Albert Ekladyous, Shelby Township, MI (US); Bruce Preston Williams, Grosse Pointe Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 187 days.

(21) Appl. No.: 13/736,265

(22) Filed: Jan. 8, 2013

(65) Prior Publication Data
US 2014/0192547 A1 Jul. 10, 2014

(51) Int. Cl.
*F21V 5/00* (2015.01)
*B60Q 1/00* (2006.01)
*B60Q 1/04* (2006.01)
(Continued)

(52) U.S. Cl.
CPC .. *B60Q 1/00* (2013.01); *B60Q 1/04* (2013.01); *F21S 48/00* (2013.01); *F21V 5/04* (2013.01)

(58) Field of Classification Search
CPC .............. F21S 48/1258; F21S 48/1159; F21S 48/1283; F21V 5/04
USPC .................. 362/487, 509, 520, 522
See application file for complete search history.

(56) References Cited

U.S. PATENT DOCUMENTS

| | | | |
|---|---|---|---|
| 6,004,014 A | 12/1999 | Yamamura | |
| 6,441,943 B1* | 8/2002 | Roberts et al. | 359/267 |
| 7,410,282 B2 | 8/2008 | Eichelberger et al. | |

(Continued)

FOREIGN PATENT DOCUMENTS

| | | |
|---|---|---|
| DE | 102006051029 A1 | 7/2007 |
| DE | 102011078653 B4 | 12/2013 |

(Continued)

OTHER PUBLICATIONS

SAE International. Printed Jan. 7, 2013. "Construction and Application of Near Field (TIR Type) lenses for Automotive Lighting Functions." http://papers.sae.org/2007-01-1040/.

(Continued)

*Primary Examiner* — Meghan Ulanday
(74) *Attorney, Agent, or Firm* — Raymond Coppiellie; Price Heneveld LLP (57) ABSTRACT

A vehicle lighting module is provided that includes a lens having a plurality of near-field lens elements, an input surface, and an exit surface. The lighting module also includes an LED light source that directs incident light through the input surface and out of the exit surface. The plurality of lens elements is configured to transmit from the exit surface a collimated light pattern containing at least 60% of the incident light. Further, a vehicle headlamp assembly is provided that includes a plurality of vehicle lighting modules, each module comprising a lens, and an LED light source that directs incident light through the lens. The assembly further includes a case for housing the lighting modules. The lens includes a plurality of lens elements configured to transmit at least 60% of the incident light in a collimated, vehicular light pattern.

18 Claims, 6 Drawing Sheets

(51) Int. Cl.
*F21V 5/04* (2006.01)
*F21S 8/10* (2006.01)

(56) References Cited

U.S. PATENT DOCUMENTS

| | | |
|---|---|---|
| 8,469,565 B2 | 6/2013 | Yatsuda |
| 2004/0213001 A1 | 10/2004 | Sayers et al. |
| 2007/0236956 A1 | 10/2007 | Kolodin et al. |
| 2008/0304277 A1 | 12/2008 | Chinniah et al. |
| 2011/0169410 A1 | 7/2011 | Dassanayake et al. |
| 2011/0205748 A1* | 8/2011 | Yatsuda .................. 362/517 |
| 2012/0038272 A1 | 2/2012 | De Castro |

FOREIGN PATENT DOCUMENTS

| | | |
|---|---|---|
| JP | H02129802 A | 5/1990 |
| JP | H04324201 A | 11/1992 |
| JP | 2000173318 A | 6/2000 |
| WO | 2007088157 A1 | 8/2007 |

OTHER PUBLICATIONS

Turkish Patent Institute, Transmittal of the 1st Examination Report in TR Patent Application No. 2013/14907 dated Jul. 3, 2015 re: Austrian Patent Office Examination Report dated Jun. 29, 2015, 6 pages.

* cited by examiner

FIG. 4C

LOW PROFILE HIGHLY EFFICIENT VEHICULAR LED MODULES AND HEADLAMPS

FIELD OF THE INVENTION

The present invention generally relates to lighting modules and assemblies and, more particularly, to vehicular headlamp assemblies.

BACKGROUND OF THE INVENTION

Conventional vehicle headlamps employ multiple components (e.g., a light source, collector, and light distributor). These headlamps are also subject to dimensional constraints associated with the lens shapes necessary to produce the required light output pattern (e.g., low-beam headlamp pattern, high-beam headlamp pattern, etc.). Light transmission efficiency is also a problem as conventional vehicular headlamps do not exceed 50% efficiency. Accordingly, these headlamps require significant energy usage. Hence, conventional headlamp options with a low profile and high light transmission efficiency are not available.

Vehicle lighting components with high transmission efficiency and design shape flexibility are therefore desirable to address these problems.

SUMMARY OF THE INVENTION

According to one aspect of the present invention, a vehicle lighting module is provided that includes a lens having a plurality of near-field lens elements, an input surface, and an exit surface. The lighting module also includes a light-emitting diode light source that directs incident light through the input surface and out of the exit surface. The plurality of lens elements is configured to transmit from the exit surface a collimated light pattern containing at least 60% of the incident light.

According to another aspect of the present invention, a vehicle headlamp assembly is provided that includes a plurality of vehicle lighting modules, each module comprising a lens, and an LED light source that directs incident light through the lens. The assembly further includes a case for housing the lighting modules. The lens includes a plurality of lens elements configured to transmit at least 60% of the incident light in a collimated, vehicular light pattern.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figures 1, 1A, 1B, 1C:
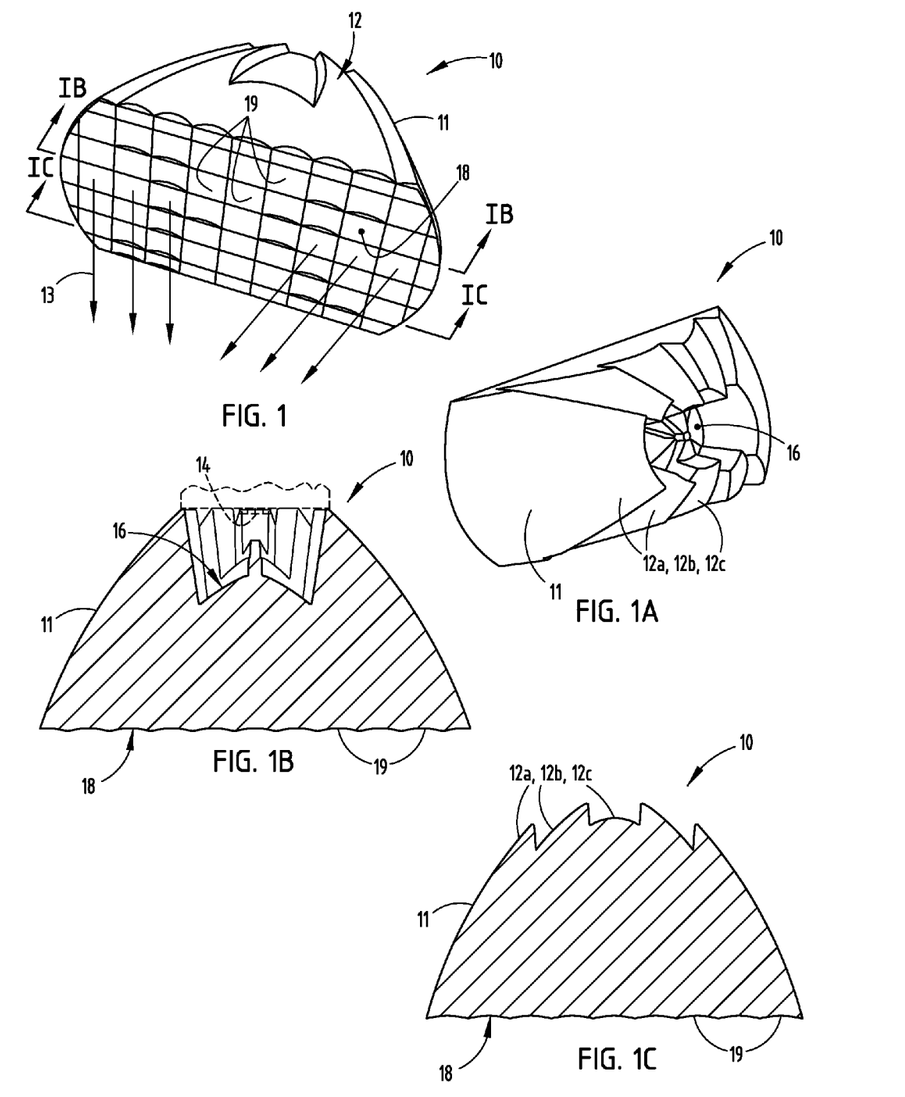
FIG. 1 is a front, perspective view of a vehicle lighting module with a lens having a substantially rectangular exit surface according to one aspect of this disclosure.
FIG. 1A a rear, perspective view of the vehicle lighting module depicted in FIG. 1.
FIG. 1B is a cross-sectional view of the vehicle lighting module depicted in FIG. 1 at line IB.-IB.
FIG. 1C is a cross-sectional view of the vehicle lighting module depicted in FIG. 1 at line IC.-IC.

For purposes of description herein, the terms "upper," "lower," "right," "left," "rear," "front," "vertical," "horizontal," and derivatives thereof shall relate to the invention as oriented in FIG. 1. However, the invention may assume various alternative orientations, except where expressly specified to the contrary. Also, the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

FIGS. 1-1C depict a vehicle lighting module 10 with a lens 11 according to one aspect of the invention. Lens 11 includes multiple near-field lens elements 12, an input surface 16 (see FIG. 1A) and exit surface 18 (see FIG. 1). As shown, the exit surface 18 of lens 11 may be substantially rectangular in shape, and the input surface 16 substantially circular in shape. Further, the exterior walls of lens 11 may be shaped to accommodate the shape of input surface 16 and exit surface 18. In addition, the lens 11 may be fabricated from an optically translucent material, such as polycarbonate, glass, or other translucent materials with high optical quality and capable of being manufactured to tight tolerances. Near-field lens elements 12, input surface 16 and exit surface 18 are integrated within lens 11. Accordingly, lens 11 is typically fabricated from one piece of material.

Figures 2, 2A, 2B, 2C:
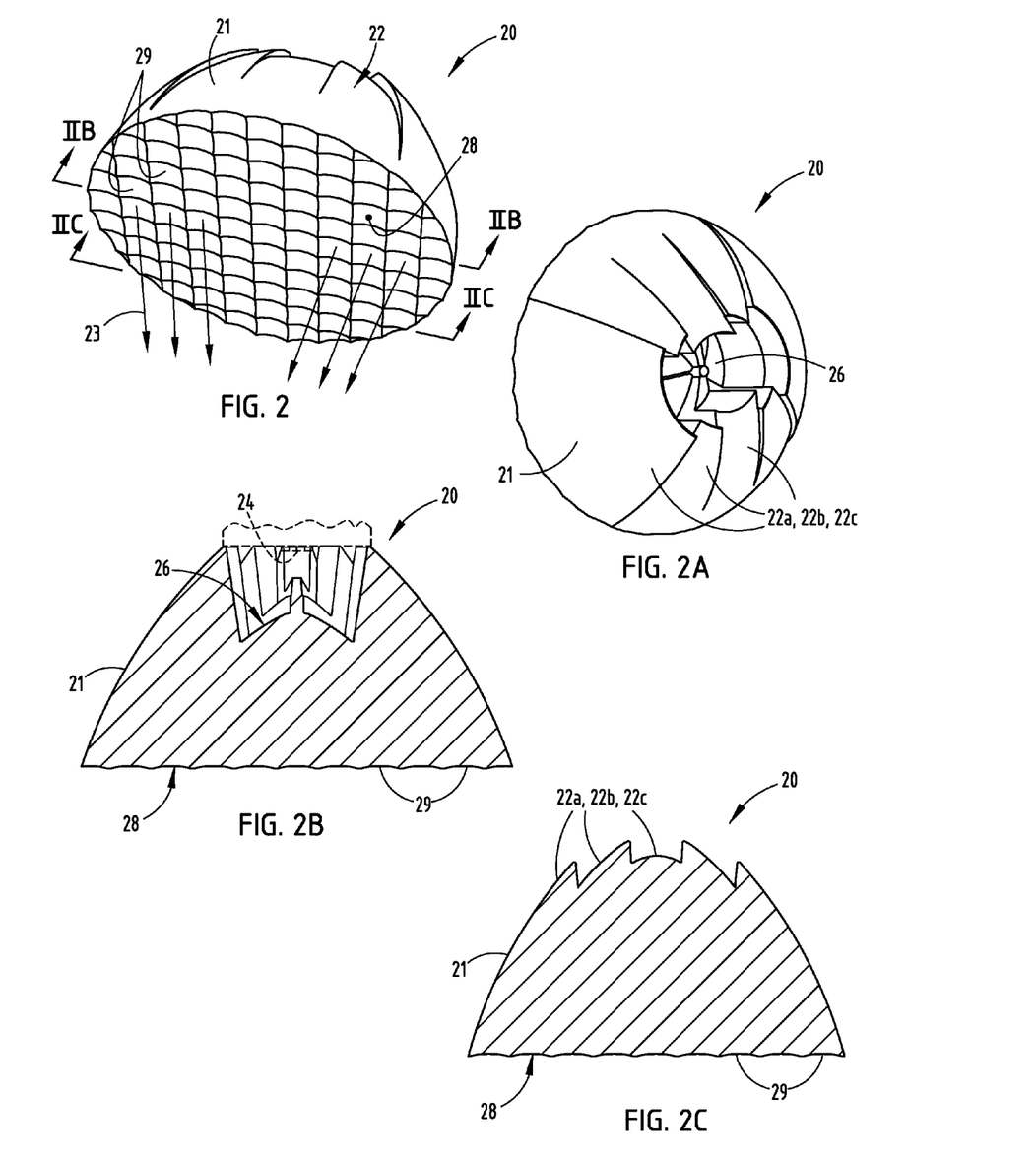
FIG. 2 is a front, perspective view of a vehicle lighting module with a lens having a substantially circular exit surface according to another aspect of this disclosure.
FIG. 2A is a rear, perspective view of the vehicle lighting module depicted in FIG. 2.
FIG. 2B is a cross-sectional view of the vehicle lighting module depicted in FIG. 2 at line IIB.-IIB.
FIG. 2C is a cross-sectional view of the vehicle lighting module depicted in FIG. 2 at line IIC.-IIC.

FIGS. 2-2C depict a vehicle lighting module 20 with a lens 21 according to another aspect of the invention. Lens 21 includes multiple near-field lens elements 22, an input surface 26 (see FIG. 2A) and exit surface 28 (see FIG. 2). As shown, the exit surface 28 of lens 21 may be substantially circular in shape, and the input surface 26 substantially circular in shape. The exterior walls of lens 21 may also be shaped to accommodate the substantially circular input and exit surfaces 26 and 28, respectively. Further, lens 21 may be fabricated from an optically translucent material, such as polycarbonate, glass, or other translucent materials with high optical quality and capable of being manufactured to tight tolerances. Near-field lens elements 22, input surface 26 and exit surface 28 are integrated within lens 21. Accordingly, lens 21 can be fabricated from one piece of material.

Both vehicle lighting modules 10, 20 include a light-emitting diode (LED) light source 14, 24 (see FIGS. 1B, 2B) that directs incident light through the input surface 16, 26 and out of the exit surface 18, 28. LED light source 14, 24 may be selected from various LED lighting technologies, included those that emanate light of wavelengths other than white. As shown in FIGS. 1B and 2B, LED light source 14, 24 may be mounted or otherwise coupled to lens 11, 21 at a position in proximity to the input surface 16, 26, respectively. Accordingly, incident light from LED 14, 24 is directed through input surface 16, 26.

As further shown in FIGS. 1-1C & 2-2C, the plurality of near-field lens elements 12, 22 are configured to transmit from the exit surface 18, 28 of lens 11, 21 a collimated light pattern 13, 23 containing at least 60% of the incident light from LED light source 14, 24. There are relatively few aspects of vehicle lighting modules 10, 20 that lead to loss of light intensity. The incident light from LED source 14, 24 is directed immediately into input surface 16, 26. Thereafter, the light is redirected and collimated by the plurality of near-field lens elements 12, 22 (e.g., lens elements 12a-12c and 22a-22c depicted in FIGS. 1A, 1C, 2A and 2C) within lens 11, 21. Accordingly, the input surface 16, 26 can include near-field lens elements 12, 22 (e.g., lens elements 12a-12c, 22a-22c) as shown in FIGS. 1A and 2A. There are no other surfaces that reflect the incident light—a process that usually results in 10-20% loss in light intensity. Hence, the overall light transmission efficiency of vehicle lighting modules 10, 20 exceeds 60%

The near-field elements 12, 22 of vehicle lighting modules 10, 20 are also employed to collimate the incident light from LED sources 14, 24. Incident light from LED light source 14, 24 is usually Lambertian in character with significant scattering in various directions. In other words, light emanates and spreads from the source in all directions—on the order of 180 degrees. The near-field lens elements 12, 22 are integrated within lens 11, 21 and function to collimate the incident light from LED source 14, 24. Each lens element 12, 22 may possess a focal length that differs from the focal lengths of other lens elements 12, 22. As such, these lens elements 12, 22 can work together to collimate the incident light from sources 14, 24. Collimation to levels below 10 degrees is feasible with these designs for lens 11, 21 and lens elements 12, 22.

As also shown in FIGS. 1-1C and 2-2C, vehicle lighting modules 10 and 20 may include a plurality of optical elements 19, 29 along the exit surface 18, 28 of lens 11, 21. Optical elements 19, 29 are configured to shape the collimated light pattern 13, 23 into a particular shape depending on the application of lighting module 10, 20. For example, optical elements 19, 29 can be configured to shape a light pattern suitable for use as a low-beam headlamp, i.e., a wide pattern directed relatively close to the vehicle lighting module 10, 20 when it is arranged in a vehicle headlamp application. As another example, optical elements 19, 29 can be configured to shape a light pattern 13, 23 suitable for use as a high-beam headlamp, i.e., a narrow pattern directed farther away from the vehicle than a low-beam headlamp. Still further, optical elements 19, 29 can be configured within vehicle lighting modules 10, 20 to shape a light pattern 13, 23 into a fog, low-beam, high-beam, static bending and/or daytime running lamps.

Vehicle light modules 10, 20 can be optimized in view of the potential trade-offs between light transmission efficiency and degree of collimation. A design of lens 11, 21 with a single near-field lens element 12, 22 generally exhibits lower transmission efficiency (e.g., 50% or less). This is particularly the case for non-circular lens elements, such as near-field lens elements 12. On the other hand, a single near-field lens element can collimate incident light with a Lambertian character from an LED source 14 down to approximately 3 degrees.

While a large degree of collimation is beneficial, particularly for high-beam headlamp applications, it can be advantageous to design lens 11, 21 with a plurality of lens elements 12, 22 to increase light transmission efficiency. Preferably, three or more near-field lens elements 12, 22 are integrated within lens 11, 21 to achieve light transmission efficiencies on the order of 65% or better with collimation levels down to 5 degrees or less. Nevertheless, certain applications do not require the degree of collimation necessary for a vehicular headlamp application. Fog lamp and daytime running light applications, for example, only require collimation from 6 to 8 degrees and less than 10 degrees, respectively. Accordingly, more near-field lens elements 12, 22 can be configured within lighting modules 10, 20 when they are employed in these less-directional applications (i.e., fog and daytime running lamps) to further increase light transmission efficiency.

The use of a plurality of near-field lens elements 12, 22 in vehicle lighting modules 10, 20 provides a large degree of design flexibility, particularly for low-profile configurations. Lighting modules having lenses with non-circularly shaped exit surfaces generally suffer from a significant loss in transmission efficiency. Here, the multiple lens elements 12, 22 integrated within lens 11, 21 (often with varying focal lengths) significantly improves the light transmission efficiency of the lighting modules 10, 20 without significant sacrifice to the degree of collimation needed for the application, such as vehicular headlamp applications. Consequently, low-profile designs of modules 10, 20 (i.e., low aspect ratios of height to width) are feasible.

Still further, the use of a single-piece design for lens 11, 21 with integrated lens elements 12, 22 results in modules 10, 20 having shorter depth profiles (in the direction from the exit surfaces 18, 28 to the input surfaces 16, 26). LED light sources 14, 24 need only be mounted in a recessed portion of lens 11, 21, not separated from input surfaces 16, 26 by any additional components. In preferred configurations of modules 10, 20, the depth profile is approximately 50 mm or less from the exit surfaces 18, 28 to the LED light sources 14, 24; the width is approximately 80 to 90 mm and the height is approximately 40 to 45 mm. Even more preferably, the depth profile of modules 10, 20 is approximately 25 mm or less; the width is approximately 80 to 90 mm and the height is approximately 20 to 25 mm. It should be understood, however, that other low profile configurations for modules 10, 20 are viable with dimensions that vary from the foregoing exemplary configuration.

Figure 3:
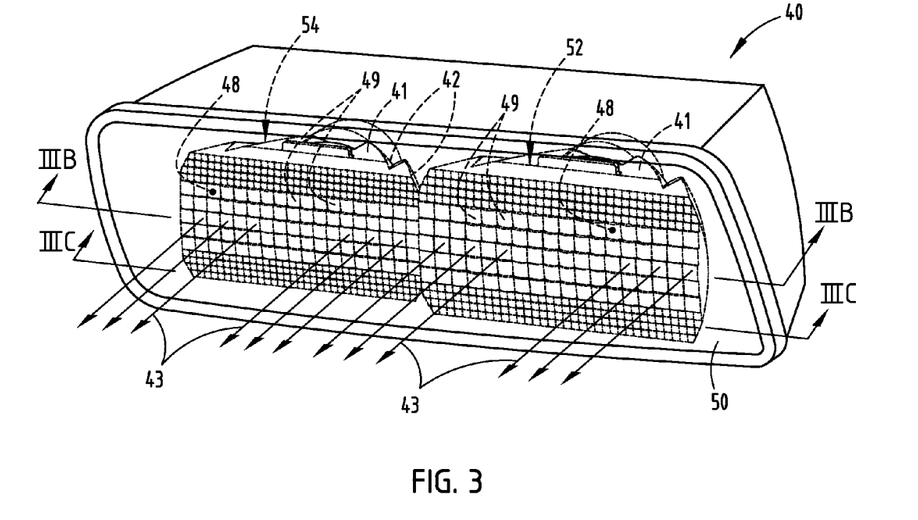
FIG. 3 is a front, perspective view of a vehicle headlamp assembly that includes a pair of vehicle lighting modules with substantially rectangular exit surfaces according to a further aspect of this disclosure.
Figure 3A:
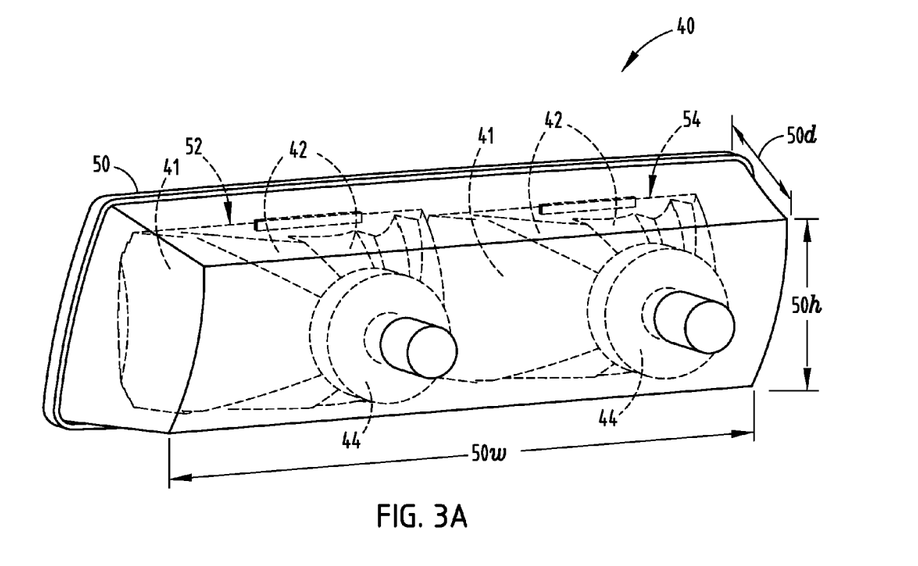
FIG. 3A is a rear, perspective view of the vehicle headlamp assembly depicted in FIG. 3.
Figure 3B:
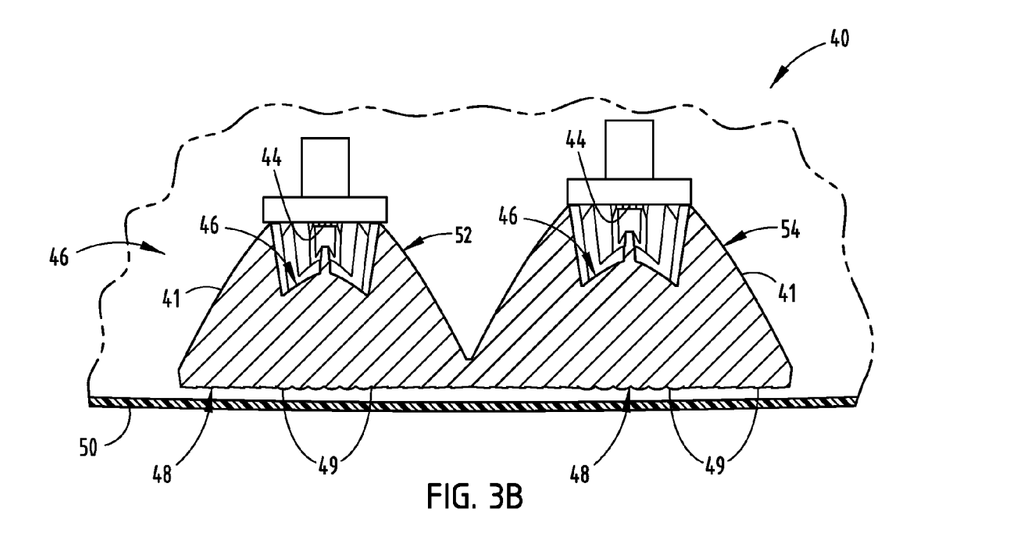
FIG. 3B is a cross-sectional view of the vehicle lighting assembly depicted in FIG. 3 at line IIIB.-IIIB.
Figure 3C:
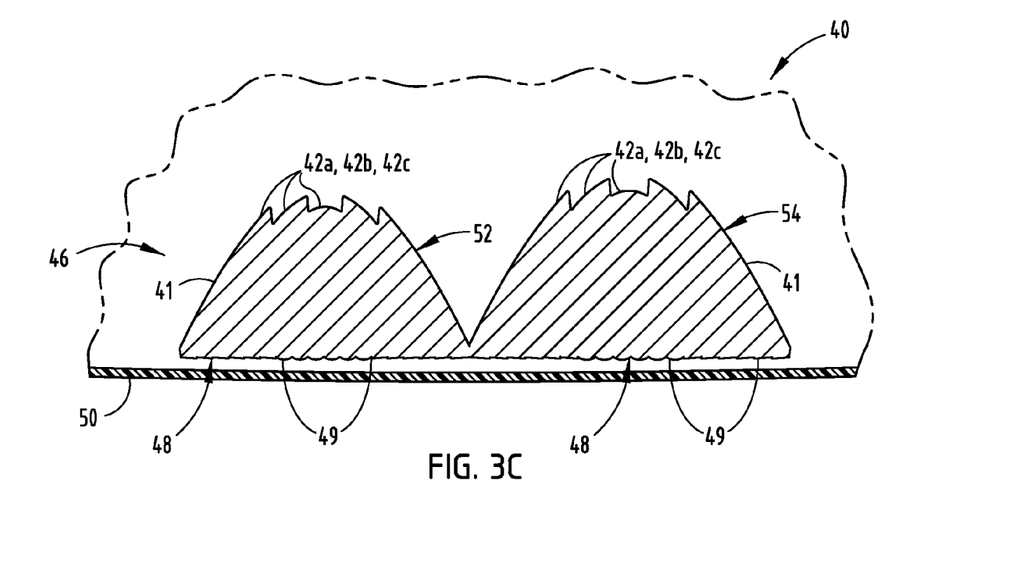
FIG. 3C is a cross-sectional view of the vehicle lighting assembly depicted in FIG. 3 at line IIIC.-IIIC.

Referring to FIGS. 3-3C, a vehicle headlamp assembly 40 is depicted according to a further aspect of the invention with a pair of adjacent lighting modules 52, 54. Modules 52, 54 may be configured for low beam and high beam headlamp applications. Each module 52, 54 includes a lens 41, and an LED light source 44 that directs incident light from light source 44 through lens 41. As shown, the exit surface 48 of lens 41 is substantially rectangular in shape, whereas the input surface 46 is substantially circular in shape. In addition, each lens 41 includes a plurality of near-field lens elements 42. These near-field lens elements 42 are configured to transmit from the exit surface 48 of lens 41 a collimated light pattern 43 containing at least 60% of the incident light from LED light source 44. It should be understood that the low beam and high beam lighting modules 52 and 54 employed by vehicle headlamp assembly 40 operate and can be configured in a fashion similar to the vehicle lighting module 10 depicted in FIGS. 1-1C (e.g., lens 41 may possess three near-field lens elements 42a, 42b and 42c with differing focal lengths as shown in FIG. 3C).

Figure 4:
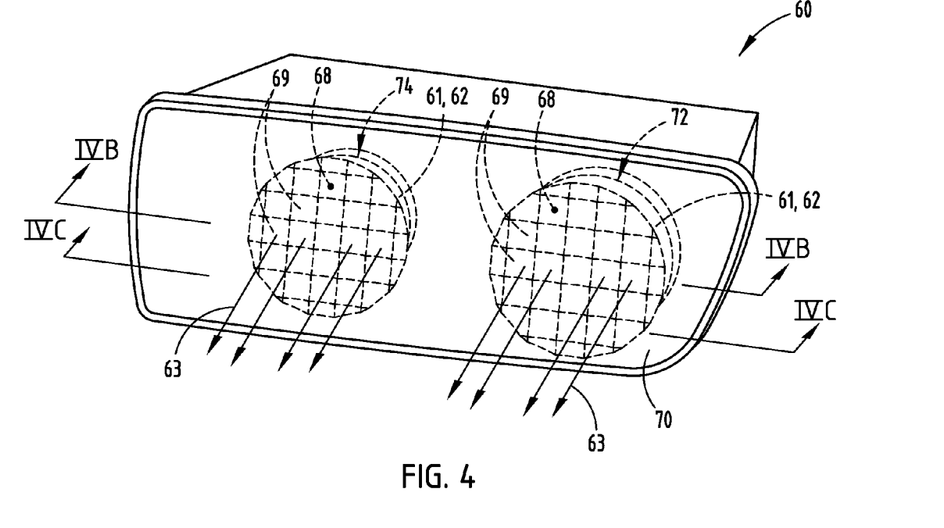
FIG. 4 is a front, perspective view of a vehicle headlamp assembly that includes a pair of vehicle lighting modules with substantially circular exit surfaces according to a further aspect of this disclosure.
Figure 4A:
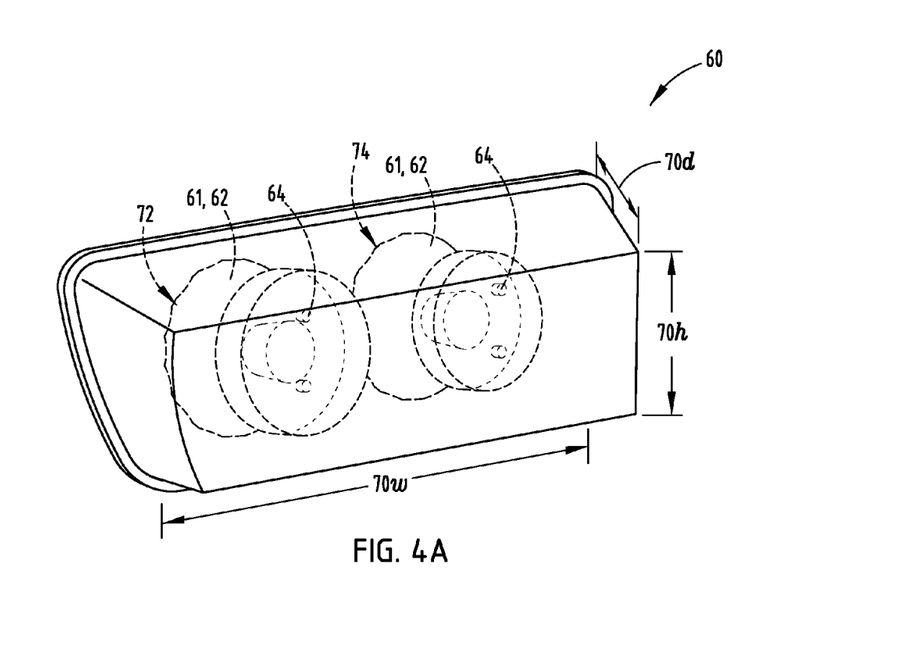
FIG. 4A is a rear, perspective view of the vehicle headlamp assembly depicted in FIG. 4.
Figure 4B:
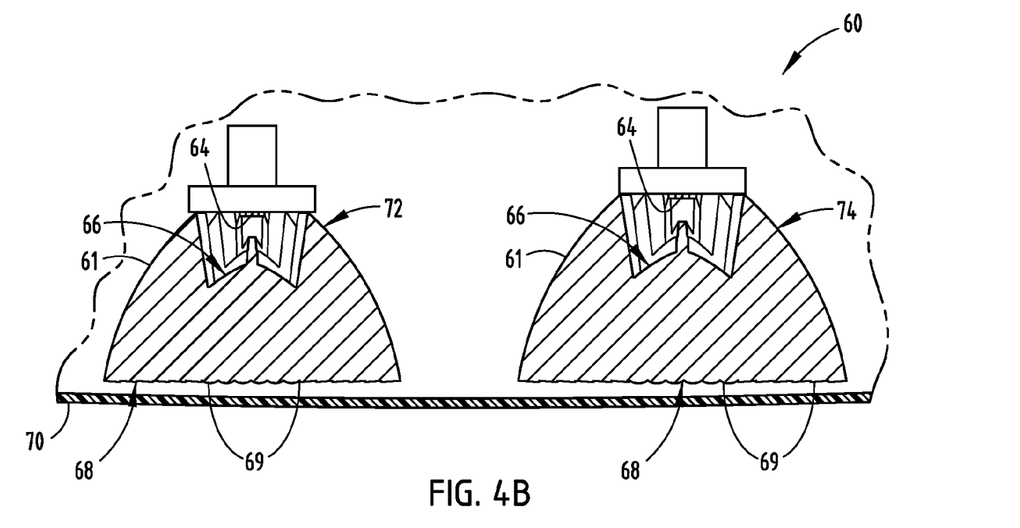
FIG. 4B is a cross-sectional view of the vehicle lighting assembly depicted in FIG. 4 at line IVB.-IVB.
Figure 4C:
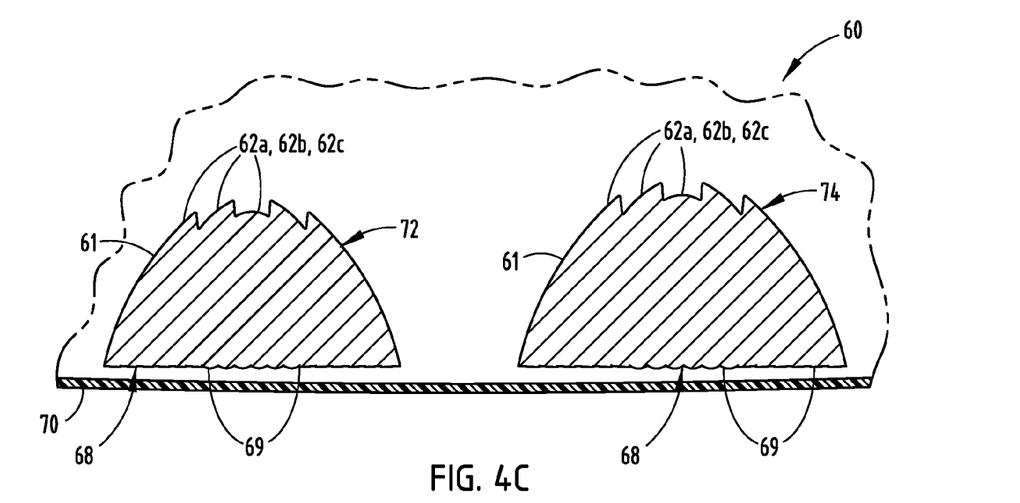
FIG. 4C is a cross-sectional view of the vehicle lighting assembly depicted in FIG. 4 at line IVC.-IVC.

Likewise, a vehicle headlamp assembly 60 is depicted according to another aspect of the invention with a pair of adjacent lighting modules 72, 74, respectively, as shown in FIGS. 4-4C. Modules 72, 74 may also be configured for low beam and high beam headlamp applications. Here, each module 72, 74 includes a lens 61, and an LED light source 64 that directs incident light from light source 64 through lens 61. The exit surface 68 of lens 61 is substantially circular in shape, comparable to input surface 66, also substantially circular in shape. In addition, each lens 61 includes a plurality of near-field lens elements 62 (comparable to lens elements 42—see FIGS. 3-3C). These near-field lens elements 62 are configured to transmit from the exit surface 68 of lens 61 a collimated light pattern 63 containing at least 60% of the incident light from LED light source 64. In addition, the low beam and high beam lighting modules 72 and 74 employed by vehicle headlamp assembly 60 can be configured and may operate in a fashion similar to the vehicle lighting module 20 depicted in FIGS. 2-2C (e.g., lens 61 may possess three near-field lens elements 62a, 62b and 62c with differing focal lengths as shown in FIG. 4C).

As further depicted in FIGS. 3, 3A and 4, 4A, headlamp assemblies 40, 60 include a case 50, 70 for housing the lighting modules 52, 54, and 72, 74, respectively. The case 50, 70 may be configured in a substantially rectangular cuboid shape, defined by a width, 50w, 70w; height, 50h, 70h; and depth, 50d, 70d. The case 50, 70 may be fabricated from various materials as known in the automotive field; however, the surface defined by the width (50w, 70w) and height (50h, 70h) of the case 50, 70 should be translucent to allow the collimated light pattern 43, 63 to exit the case according to its intended function (e.g., a collimated low-beam headlamp pattern, a high-beam headlamp pattern, etc.).

FIGS. 3-3C and 4-4C also depict vehicle headlamp assemblies 40 and 60 with lighting modules 52, 54 and 72, 74 that include a plurality of optical elements 49, 69 along the exit surface 48, 68 of lens 41, 61. Optical elements 49, 69 are configured to shape the collimated light pattern 43, 63 into a particular shape—e.g., low-beam or high-beam headlamp patterns. Still further, optical elements 49, 69 can be configured within vehicle lighting modules 52, 54 and 72, 74 to shape a light pattern 43, 63 into a fog, low-beam, high-beam, static bending and/or daytime running lamps, depending on the desired application. Preferably, these cases 50, 70 are dimensioned, and the modules 52, 54 and 72, 74 configured, such that the height-to-width aspect ratio of the case is approximately 1:8. Even more preferably, the height-to-width ratio is approximately 1:4 for the cases 50, 70. In addition, cases 50, 70 may have the following dimensions: height 50h, 70h of approximately 20 to 55 mm; width 50w, 70w of approximately 150 to 200 mm; and depth 50d, 70d of approximately 20 to 55 mm.

The foregoing embodiments are exemplary. Other configurations are viable according to the invention. For example, lens 11, 21 employed in modules 10, 20 can possess a near-field lens element composite 12, 22 with continuously varying focal lengths. Such a configuration is comparable to a plurality of near-field lens elements. As another example, the exit surfaces 18, 28 of lens 11, 21 may be characterized by various shapes, provided that they can accommodate a plurality of near-field lens elements 12, 22. It should also be understood that headlamp assemblies 40, 60 can possess various quantities and shapes of lighting modules 52, 54, 72, 74, according to the desired headlamp functionality. For instance, headlamp assemblies 40, 60 may possess multiple, low profile lighting modules 52, 54, 72 and/or 74 for a given lighting or signaling function (e.g., a low-beam function with two lighting modules 52). Accordingly, the headlamp assemblies 40, 60 could contain two sets of lighting modules, each designated for low-beam and high-beam functionality.

Variations and modifications can be made to the aforementioned structure without departing from the concepts of the present invention. Further, such concepts are intended to be covered by the following claims unless these claims by their language expressly state otherwise.

We claim:

1. A vehicle lighting module, comprising:
   a lens having an input surface including a purality of near-field lens elements, and an exit surface, each element having a different focal length; and
   an LED light source positioned to direct incident light through the input surface,
   wherein the elements are configured to shape the light from the input surface into a collimated light pattern emanating from the exit surface containing at least 60% of the incident light.

2. The vehicle lighting module according to claim 1, wherein the light source and the exit surface of the lens collectively define a depth of approximately 50 millimeters or less.

3. The vehicle lighting module according to claim 1, wherein the light source and the exit surface of the lens collectively define a depth of approximately 25 millimeters or less.

4. The vehicle lighting module according to claim 1, wherein the exit surface of the lens is arranged in a substantially circular shape.

5. The vehicle lighting module according to claim 1, wherein the exit surface of the lens is arranged in a substantially rectangular shape.

6. The vehicle lighting module according to claim 1, wherein the exit surface of the lens comprises a plurality of optical elements configured to shape the collimated light pattern into a low-beam light pattern.

7. The vehicle lighting module according to claim 1, wherein the exit surface of the lens comprises a plurality of optical elements configured to shape the collimated light pattern into a high-beam light pattern.

8. The vehicle lighting module according to claim 1, wherein the collimated light pattern is suitable for a vehicular lamp from the group consisting of fog, low-beam, high-beam, static bending and daytime running lamps.

9. A vehicle headlamp assembly, comprising:
   a plurality of vehicle lighting modules, each module comprising a lens with an input and exit surface, and an LED light source position to direct incident light into the input surface; and
   a case housing the modules,
   wherein the input surface comprises a plurality of lens elements configured to shape at least 60% of the incident light into a collimated light pattern emanating from the exit surface, each element having a different focal length.

10. The vehicle headlamp assembly according to claim 9, wherein the case has a substantially rectangular cuboid shape.

11. The vehicle headlamp assembly according to claim 9, wherein the light source and the exit surface of the lens, associated with each vehicle lighting module, collectively define a depth of approximately 50 millimeters or less.

12. The vehicle headlamp assembly according to claim 9, wherein the light source and the exit surface of the lens, associated with each vehicle lighting module, collectively define a depth of approximately 25 millimeters or less.

13. The vehicle headlamp assembly according to claim 9, wherein the exit surface of the lens associated with each vehicle lighting module is arranged in a substantially circular shape.

14. The vehicle headlamp assembly according to claim 9, wherein the exit surface of the lens associated with each vehicle lighting module is arranged in a substantially rectangular shape.

15. The vehicle headlamp assembly according to claim 9, wherein the exit surface of the lens associated with each vehicle lighting module comprises a plurality of optical elements configured to shape the collimated light pattern.

16. The vehicle headlamp assembly according to claim 10, wherein the case has a height-to-width aspect ratio of approximately 1:8.

17. The vehicle headlamp assembly according to claim 10, wherein the case has a height-to-width aspect ratio of approximately 1:4.

18. The vehicle headlamp assembly according to claim 10, wherein the case has a height of approximately 20 to 55 mm, a width of approximately 150 to 200 mm, and a depth of approximately 20 to 55 mm.

* * * * *